United States Patent [19]

Adams et al.

[11] Patent Number: 5,065,962
[45] Date of Patent: Nov. 19, 1991

[54] DIGITAL POWER CONTROLLER

[75] Inventors: William J. Adams, Torrance; Barbara G. Jex Courter, El Segundo; Craig S. Fong, Torrance; Robert C. Murray, Inglewood; Paul A. Marshall, Burbank, all of Calif.

[73] Assignee: Rockwell International Corporation, El Segundo, Calif.

[21] Appl. No.: 457,892

[22] Filed: Dec. 27, 1989

[51] Int. Cl.[5] .................. B64C 13/04; B64C 19/00
[52] U.S. Cl. .......................... 244/234; 244/220; 244/175; 244/228; 74/491
[58] Field of Search ............ 244/234, 175, 220, 221, 244/228, 230; 60/243, 39.281; 74/491; 200/61.89, 61.9, DIG. 32, 61.85; 364/431.01

[56] References Cited

U.S. PATENT DOCUMENTS

| | | | |
|---|---|---|---|
| 1,909,182 | 5/1933 | Lanagan | 244/234 X |
| 2,901,919 | 9/1959 | Cravero | 74/491 |
| 4,567,786 | 2/1986 | Sakurai | 244/220 X |
| 4,574,651 | 3/1986 | Nordström | 244/234 X |
| 4,651,954 | 3/1987 | Miller | 244/234 X |
| 4,686,825 | 8/1987 | Cavasa et al. | 60/39.281 X |
| 4,901,952 | 2/1990 | Curtis | 244/234 |

Primary Examiner—Margaret A. Focarino
Assistant Examiner—James M. Kannofsky
Attorney, Agent, or Firm—Lawrence N. Ginsberg; Charles T. Silberberg

[57] ABSTRACT

A digital power controller for an aircraft having a computer controlled propulsion system is disclosed. A movable handle is in electronic communication with a computer of the propulsion system. The handle is positionable is a neutral location for maintaining the aircraft at a substantially constant velocity and for resetting power command functions. The handle is also positionable in locations forward the neutral location for commanding increasing acceleration rates of the aircraft. The handle is positionable in locations aft the neutral location for commanding increasing deceleration rates of the aircraft. A switch associated with the movable handle is engagable at the forward end aft positions for commanding velocity hold and for permitting reposition of the handle to the neutral location for resetting power command functions.

10 Claims, 6 Drawing Sheets

DIGITAL POWER CONTROLLER

BACKGROUND OF THE INVENTION

1. Field of the Invention

This invention relates to power controllers for aircraft and more particularly to a digital power controller used to command acceleration and deceleration rates and for maintaining a selected velocity.

2. Description of the Related Art

Traditionally, propulsion control for aircraft has been by throttles which act as lever arms to control fuel flow via direct mechanical linkages to the engine, thus commanding greater or less power. More recently, fuel flow has been controlled by electromechanical throttles. For example, U.S. Pat. No. 4,686,825, issued to V. Cavasa et al, entitled System For Supplying Fuel to an Aircraft Engine, discloses a system for supplying fuel to an aircraft engine. The system has a pivoted throttle unit wherein the lever position corresponds to engine speeds settings.

U.S. Pat. No. 4,567,786, issued to S. Sakurai, entitled Modular Multi-Engine Thrust Control Assembly, discloses a modular thrust control lever assembly with pivoted levers whose positions correspond to engine speed settings. The Sakurai invention derives benefits from its compact envelope. Built-in throttle inhibitors prevent improper throttle movement in multi-engine applications.

Other inventional throttle assemblies operate, in principle, by having lever position directly corresponding to fuel flow to the engine.

Current and next generation high speed, high performance aircraft require more input than merely flow or engine speed to attain specific speeds. Other commands, such as engine configuration, must also be individually inputed by the pilot with current throttle systems.

With these performance aircraft, the pilot would be required to manually perform many operations at once. A system which allows the pilot to make one action to control several functions simultaneously is desired. Accomplishment of this action necessitates a computer controlled system which commands fuel flow, engine configuration, etc. The invention described herein addresses a controller for communicating pilot request for changes in airspeed to the computer. This type of controller is also suited for a high g, highly agile fighter-type environment.

Present co-applicants, Adams and Jex Courter, have developed a novel control console for aircraft disclosed and claimed in U.S. Ser. No. 288,502 entitled "Translating Center Control System". This center console is particularly adaptable for high-g environments. The center console provides a pedestal for the primary flight controllers. The console is centrally located in front of the pilot. This center location, between the pilot's knees, and below and aft the front instrument panel, places limits on the size of the console, particularly the width. Use of the center console allows translational movement thereof for anthropometric adjustment and escape. Adaptation of flight controllers for use with the center console is problematic. Conventional flight controllers cannot simply be relocated to the center location from their side console positions. The electromechanical connections used are too large to fit within the confines of the center console. The packaging constraints imposed by console dimensions, both surface and internal, dictate that new controllers be developed, incorporating digital controls/connections.

SUMMARY OF THE INVENTION

The present invention is a digital power controller for an aircraft having a computer controlled propulsion system. In its broad aspects, the present invention comprises a movable handle in electronic communication with a computer of the propulsion system. The handle is positionable in a neutral location for maintaining the aircraft at a substantially constant velocity and for resetting power command functions. The handle is also positionable in locations forward of the neutral location for commanding increasing acceleration rates of the aircraft. The handle is positionable in locations aft of the neutral location for commanding increasing deceleration rates of the aircraft. Switching means are associated with the movable handle and are engagable at forward and aft positions for commanding velocity hold and for permitting reposition of the handle to the neutral location for resetting power command functions.

In its more narrower aspects, the switching means includes velocity hold switching means for communicating with the computer to maintain the aircraft velocity at a substantially constant speed and for activating a vernier control switch which provides incremental adjustments in aircraft velocity. Detent switching means is provided for communicating with the computer to disengage velocity hold and to disengage the vernier control switch, thereby permitting power command functions.

The present invention provides significant advantages over the related art. Most conventional throttle controllers provide control which corresponds to a level of thrust. These controllers present a problem if a wide range of thrust is required. Particularly, with the advent of hypersonic vehicles the thrust levels would span such wide ranges that conventional position-dependent thrusters would be rendered inoperable. The present applicants novel movable handle/switching means combination is particularly useful for use with these hypersonic vehicles.

Furthermore, as noted above, the present invention is particularly useful with present co-applicants Adams and Jex Courter's patent application entitled "Translating Center Control Console", Ser. No. 288,502. Additionally, the digital design of the present invention obviates the need for the cables, linkages, and most electromechanical devices common in conventional controllers.

BRIEF DESCRIPTION OF THE DRAWINGS

The same elements throughout the figures are designated by the same reference characters.

DETAILED DESCRIPTION OF THE PREFERRED EMBODIMENTS

Figure 1:
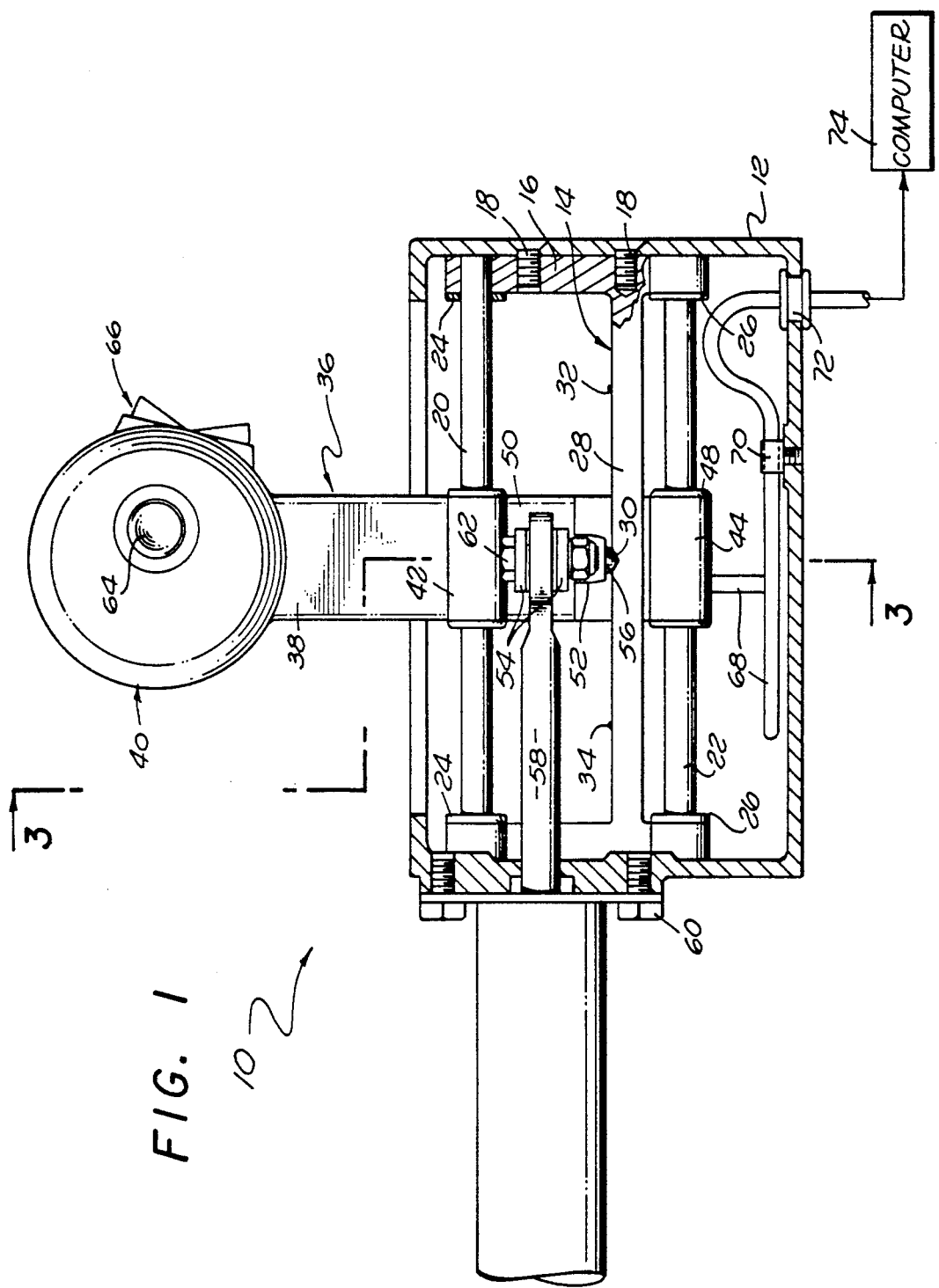
FIG. 1 is a schematic illustration of a side view of the preferred embodiment of the present invention, partially in cross-section.
Figure 2:
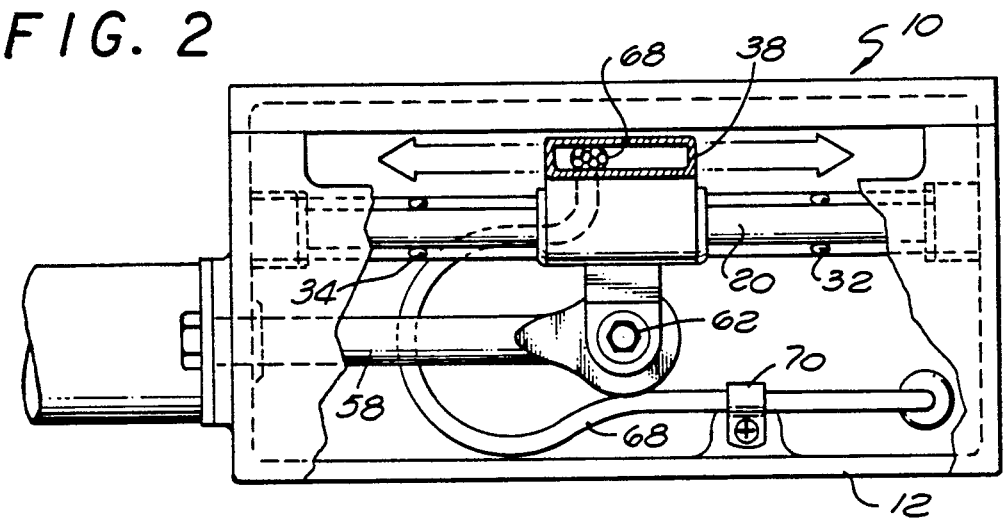
FIG. 2 is a top view of the present invention, partially in cross-section, shown along line 1—1 of FIG. 1, with the handle removed for clarity.
Figure 3:
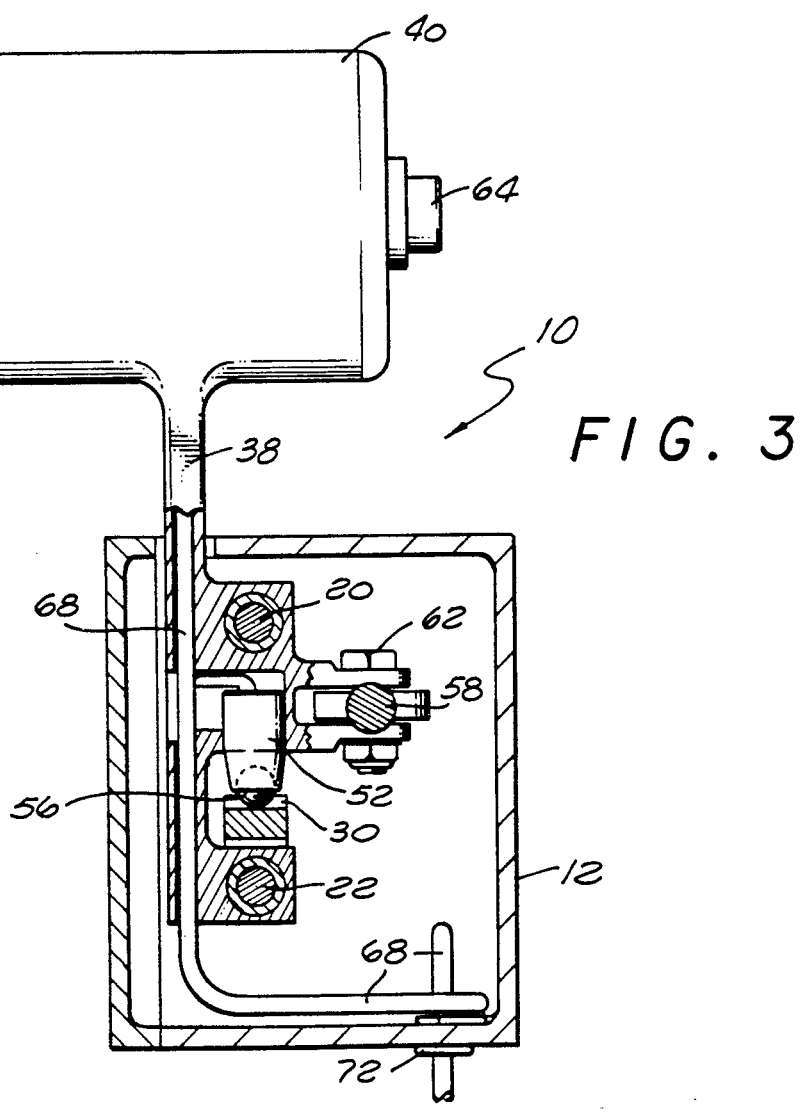
FIG. 3 is an end view, looking forward, taken along line 3—3 of FIG. 1.

Referring to the drawings and the characters of reference marked thereon, FIGS. 1, 2 and 3 illustrate a preferred embodiment of the present invention, designated generally as 10. A housing 12 supports a linear cam 14. Linear cam 14 includes vertical portions 16 which provide mating surfaces for the housing through screw fasteners 18. Vertical portions 16 also provide mating surfaces for upper handle guide 20, lower handle guide 22, upper travel limit stops 24 and lower travel limit stops 26.

Linear cam 14 also includes a horizontal portion 28 with an upper roller surface having a central detent groove 30, a forward bump 32, and an aft bump 34. Elements 30, 32 and 34 provide tactile feedback of limits within the power control range, as will be discussed below.

A moveable handle, designated generally as 36 is supported by the upper and lower parallel handle guides 20, 22. Handle 36 includes a handle shaft 38 terminating in a handle grip 40. Upper and lower shaft attachments 42, 44 and associated bushing/stops 46, 48 provide smooth forward and aft motion for the handle 36 along the parallel guides 20, 22.

The handle shaft 38 includes a shaft protrusion 50 (shown most clearly in FIG. 3). Protrusion 50 supports a detent switch 52 and a transducer clevis 54. The detent switch 52 contains a roller ball 56 that rolls along the upper surface of the horizontal portion 28 of the linear cam 14. The transducer clevis 54 attaches a linear transducer 58 which is mounted on the housing 12 with two threaded fasteners 60. The transducer 58 is attached to the transducer clevis 54 by fastener 62.

The handle grip 40 includes a velocity hold switch 64 which may be, for example, a thumb operated button. Grip 40 also includes a vernier control switch 66, which may be, for example, index finger operated.

The associated wiring from the velocity hold switch 64 and vernier control switch 66 and the detent groove 52 are combined as a wire bundle 68 in the handle shaft 38, which protrudes from the lower end of the handle 36. The wire bundle 68 provides a loop at the bottom of the housing 12 to allow for handle travel. Clamps 60 and grommet 72 provide secure mounting to the housing. Wire bundle 68 attaches to the computer 74.

Figure 4:
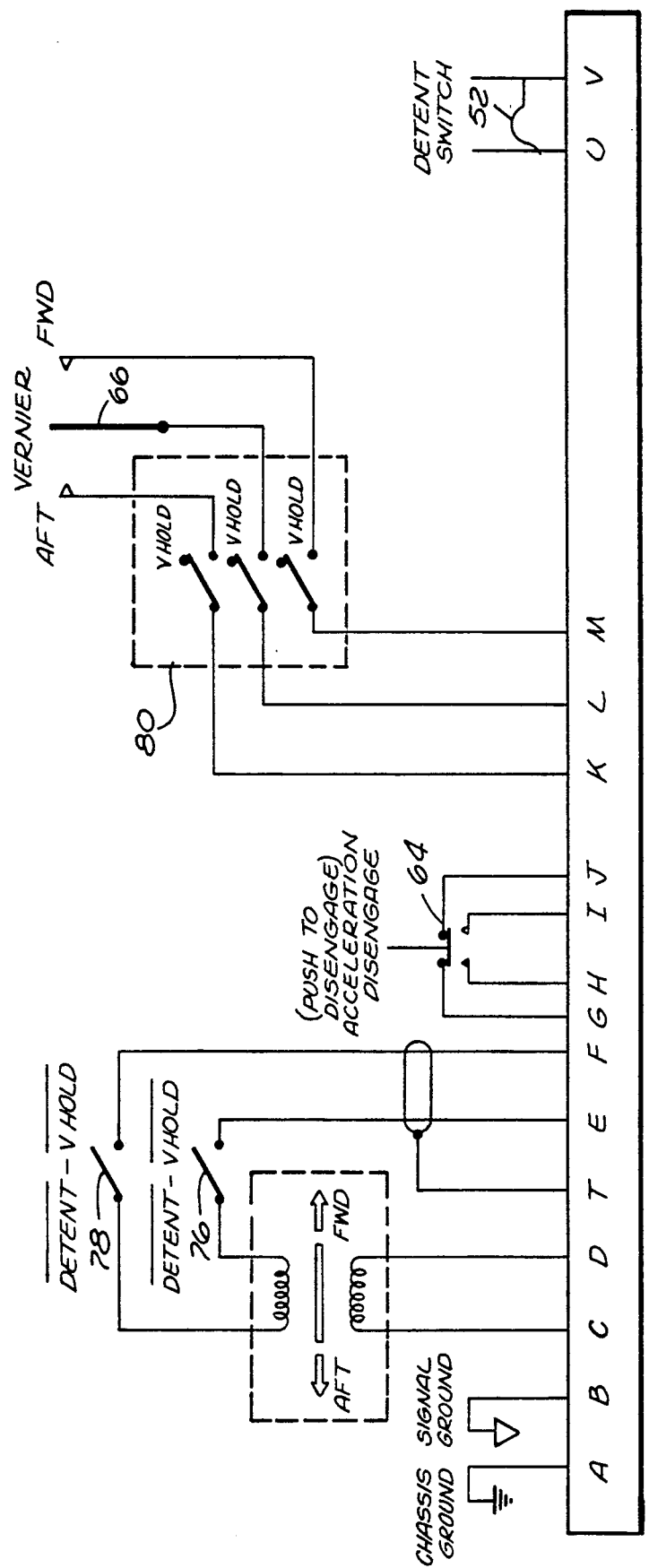
FIG. 4 is an electrical schematic of the switching system of the present invention.

FIG. 4 illustrates a preferred electrical schematic of the switching system of the present invention. Movement of the handle from the detent groove depresses the detent switch 52. This sends a signal to the computer to check the phase of the signal from the linear transducer 58, closes switches 76 and 78, and disengages velocity hold. The amount of movement of the linear transducer 58 determines the rate of acceleration.

When the desired airspeed is achieved the velocity hold switch 64 is depressed. This disengages switches 76 and 78 and closes switches 80 to activate the vernier control switch 66. Operation of vernier control switch 66 sends a signal along the appropriate signal path resulting in incremental increases or decreases in velocity. Returning the handle to the detent groove causes detent switch 52 to send a signal to the computer and resets the velocity hold switch 64.

At the start of operation of the digital power controller 10, the movable handle 36 is in the neutral detent position. In this position, the rollerball 56 rests in detent groove 30. For initial forward movement of the vehicle the handle 36 is moved to a position forward of the detent 30 along handle guides 20, 22. This movement translates linear transducer 58, the position thereof communicating desired acceleration rate changes. The distance of the handle 36 from the detent groove 30 determines the rate of increasing acceleration or rate of increasing deceleration. Once the pilot obtains the desired airspeed, the velocity hold switch 64 is depressed. This causes the computer 74 to select the current airspeed as the speed for velocity hold. Depression of the velocity hold switch 64 also activates the vernier control switch 66.

Vernier control switch 66 may be used to make incremental speed adjustments. Movement of switch 66 forward/down commands incremental increases in velocity. Movement of switch aft/up results in incremental decreases in velocity. The pilot then moves the handle 36 back to the central detent groove 30. Thus, rollerball 56 falls into groove 30 resulting in the resetting of the velocity hold switch 64. The vernier control switch 66 remains active at this time. The velocity hold function is maintained until the movable handle 36 is again removed from the central detent groove 30 and moved either forward or aft—forward for increasing accelerations and aft for increasing decelerations. Movement of the handle past the optional forward or aft bumps, represents maximal acceleration or deceleration capabilities.

Figure 5:
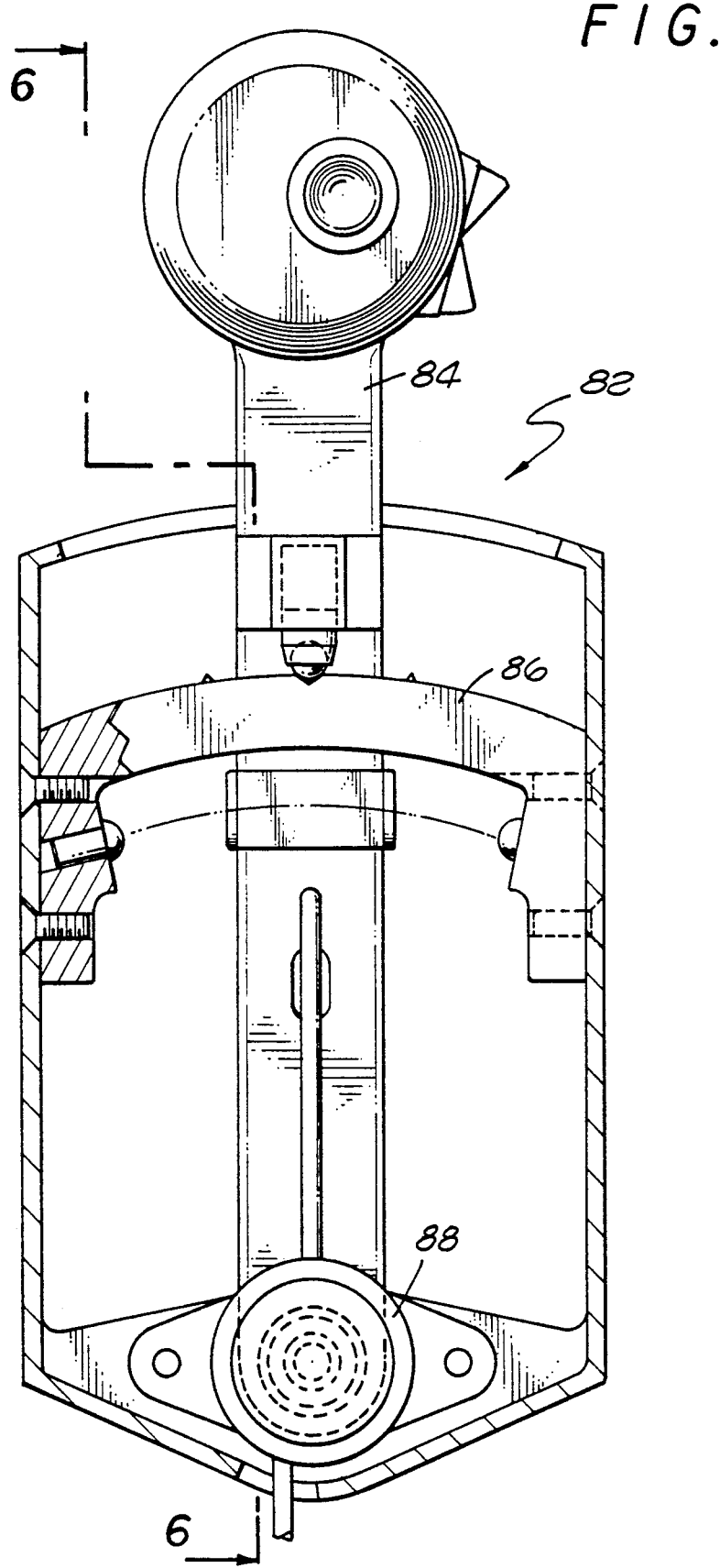
FIG. 5 is an alternate embodiment of the present invention, which utilizes a pivoting handle, radial cam and rotary transducer.
Figure 6:
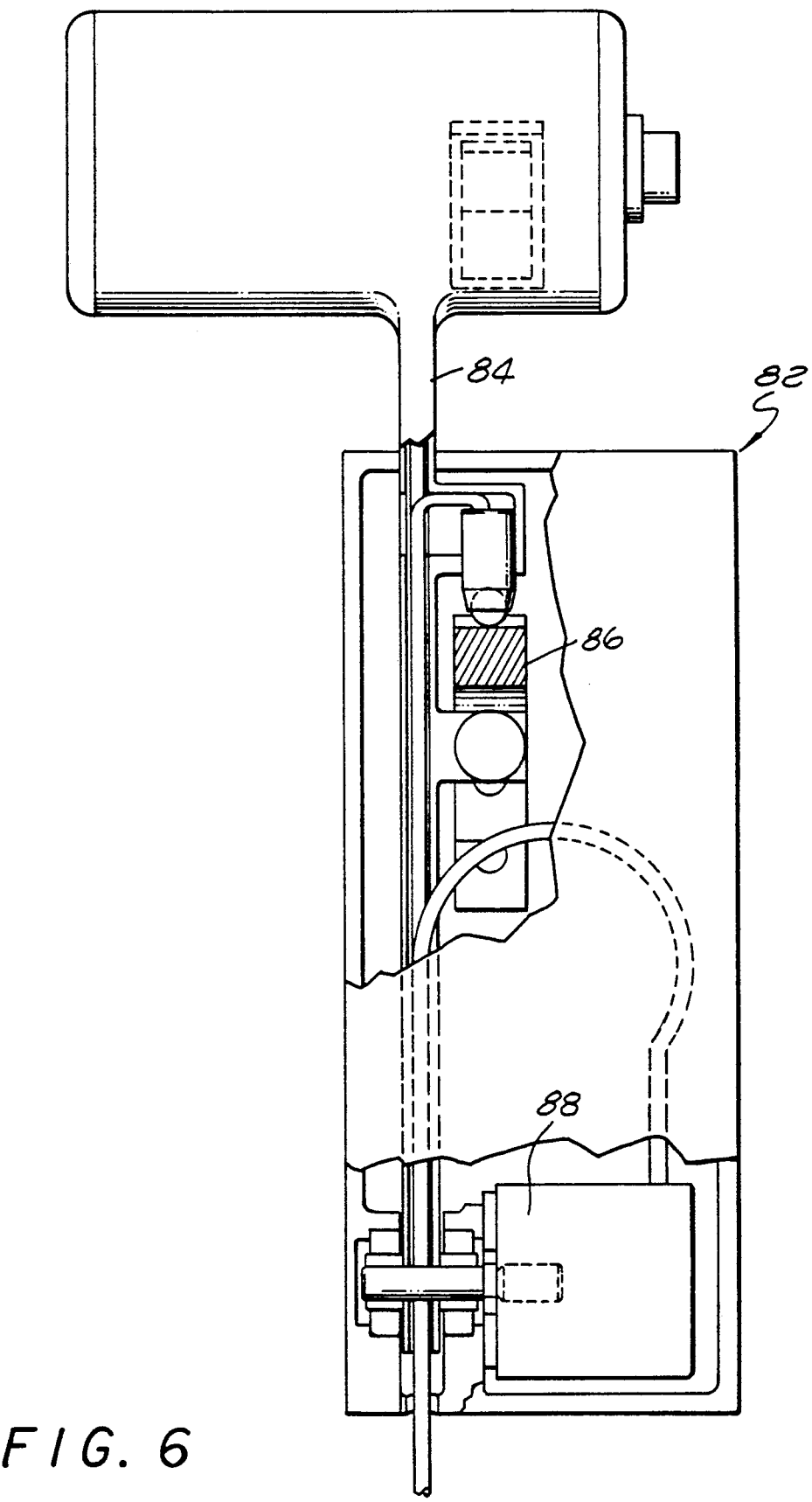
FIG. 6 is an end view, looking forward, of the embodiment of FIG. 5, taken along line 6—6 of FIG. 5.

Referring now to FIGS. 5 and 6 an alternate embodiment of the digital power controller is illustrated, designated generally as 82. Controller 82 utilizes a pivoting handle 84 with a radial cam 86 and a rotary transducer 88. This provides an optional packaging envelope for use in selected applications. The other operational features are the same as in the previous embodiment.

Figure 7:
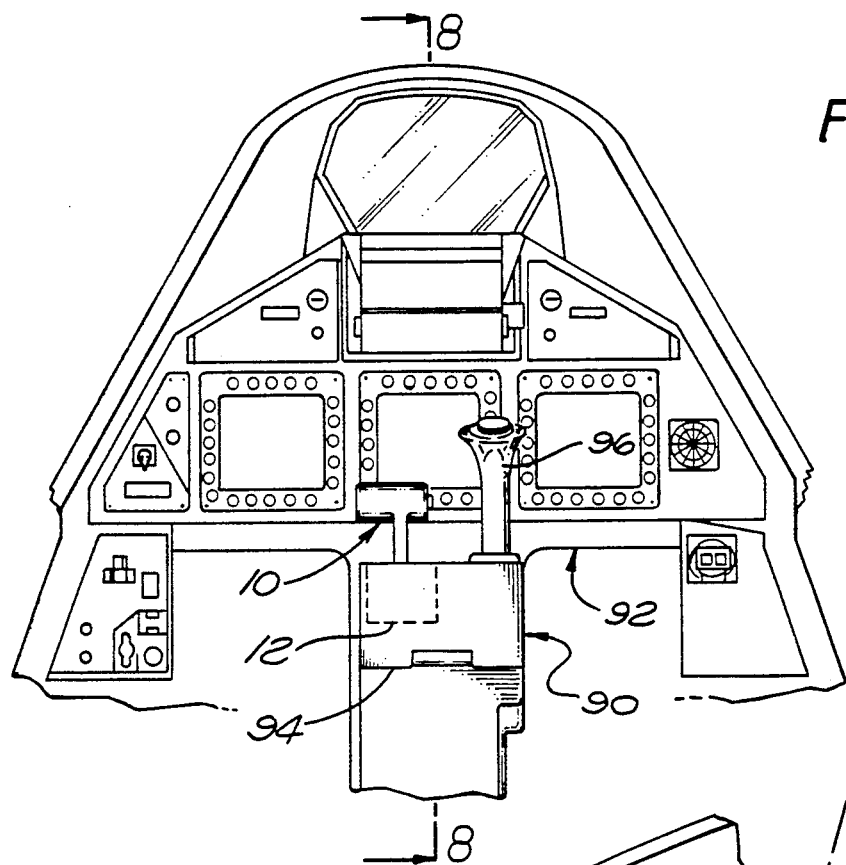
FIG. 7 is a face on view of an instrument panel of an aircraft, illustrating a center flight management console having the power controller of the present invention attached thereto.

Referring now to FIG. 7 the power controller 10 of the present invention is illustrated in combination with a center flight management console 90 disposed on an instrument panel 92. The center console 90 may be of the type disclosed in co-applicants Adams and Jex Courter's copending patent application entitled, "Translating Center Control System", Ser. No. 288,502, filed Dec. 21, 1988 which is hereby incorporated by reference. The housing 12 of the controller 10 is mounted within the pedestal 94 of the console 90. The controller 10 is located to the left of the flight control stick 96. The controller 10 has a small, adaptable package which is particularly suited for use with console 90. The aforementioned characteristics of the controller 10 allow for a wide range of operations within a small volume. For example, the handle 12 preferably has a total translation of approximately inches. However, this can be varied to meet the specific packaging requirements.

Figure 8:
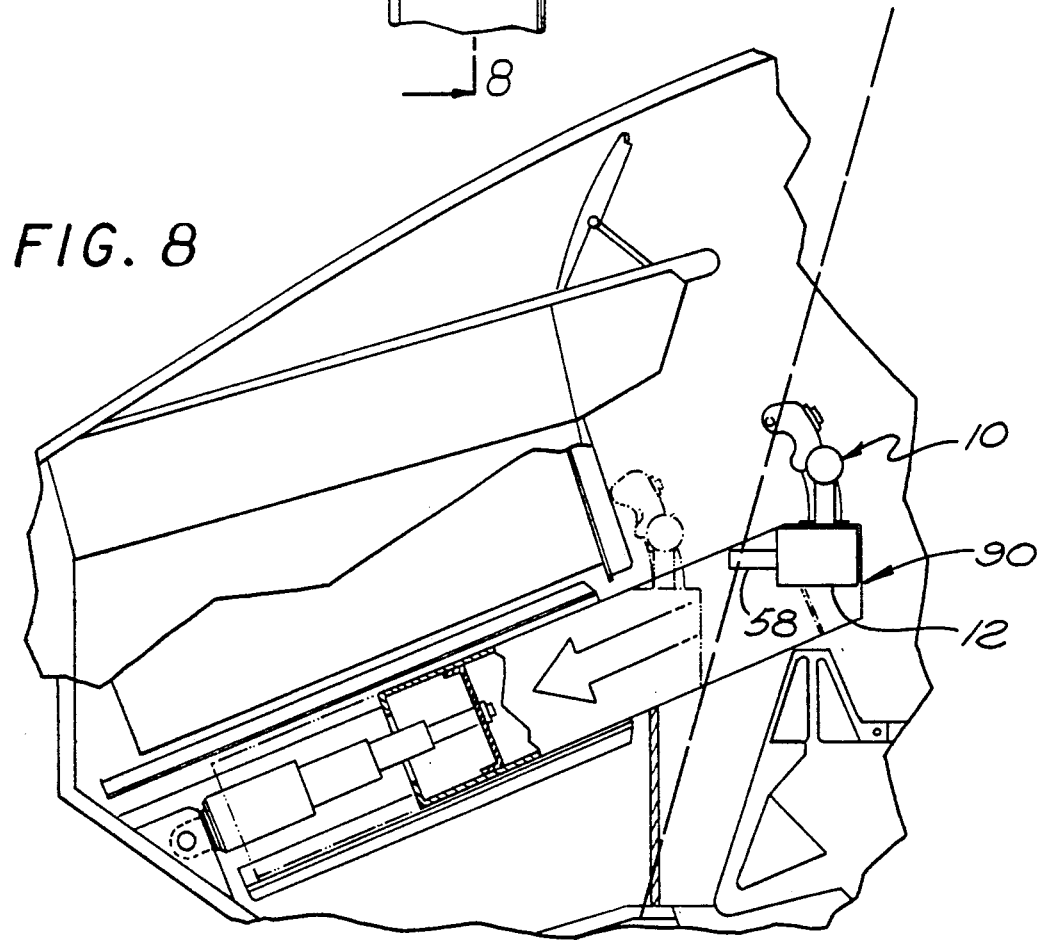
FIG. 8 is a view along line 7—7 of FIG. 6, illustrating the positional characteristics of the console and controller.

The location of the transducer 58 may also be varied to meet a specific design requirement. For example, referring now to FIG. 8, it can be seen that the linear transducer 58 is on the forward end of housing 12 to fit within the volume of center console 90. (This is distinguishable from the rear transducer location illustrated in FIG. 1.) FIGS. 7 and 8 are adapted from patent application Ser. No. 288,502, and have been modified to incorporate the digital power controller 10 of the present invention.

Obviously, many modifications and variations of the present invention are possible in light of the above teachings. It is therefore to be understood that, within the scope of the appended claims, the invention may be practiced otherwise than as specifically described.

For example, for aircraft having afterburner capabilities, movement of the handle forward of the forward bump engages the detent switch which sends a signal to the computer to command afterburner.

Similarly, for aircraft having reverse thrust capabilities movement of the handle aft of the aft bump engages the detent switch which sends a signal to the computer to command thrust reversal, provided other conditions are met.

Either of the previous embodiments may be easily modified for multiple engine/multiple handle applications.

We claim:

1. A digital power controller for an aircraft having a computer controlled propulsion system, comprising:
   (a) a movable handle in electronic communication with a computer of said propulsion system, said handle being positionable in a neutral location for maintaining the aircraft at a substantially constant velocity and for resetting power command functions,
   said handle being positionable in locations forward said neutral location for commanding increasing acceleration rates of said aircraft,
   said handle being positionable in locations aft said neutral location for commanding increasing deceleration rates of said aircraft; and
   (b) switching means associated with said movable handle, said switching means engagable at said forward and aft positions for commanding velocity hold and for permitting reposition of said handle to said neutral location for resetting power command functions.

2. The digital power controller of claim 1 wherein said moveable handle further includes a vernier control switch for incremental adjustments in aircraft velocity.

3. The digital power controller of claim 2 wherein said switching means includes:
   (a) velocity hold switching means for communicating with said computer to maintain the aircraft velocity at a substantially constant speed and for activating said vernier control switch; and
   (b) detent switching means for communicating with said computer to disengage velocity hold and to disengage the vernier control switch, thereby permitting power command functions.

4. The digital power controller of claim 1 further including linear handle guide means for providing movement of said handle in a substantially linear direction.

5. The digital power controller of claim 1 further including means for providing radial movement of said handle.

6. A digital power controller for an aircraft having a computer controlled propulsion system and a center console of the type including a pedestal disposed in a central location between the pilot's knees, and below and aft the front instrument panel of the aircraft, said digital power controller comprising;
   (a) a housing mounted within said pedestal;
   (b) a movable handle attached to said housing and in electronic communication with a computer of said propulsion system, said handle being positionable in a neutral location for maintaining the aircraft at a substantially constant velocity and for resetting power command functions,
   said handle being positionable in locations forward said neutral location for commanding increasing acceleration rates of said aircraft,
   said handle being positionable in locations aft said neutral location for commanding increasing deceleration rates of said aircraft; and
   (c) switching means associated with said movable handle, said switching means engagable at said forward and aft positions for commanding velocity hold and for permitting reposition of said handle to said neutral location for resetting power command functions.

7. The digital power controller of claim 6 wherein said moveable handle further includes a vernier control switch for incremental adjustments in aircraft velocity.

8. The digital power controller of claim 7 wherein said switching means includes:
   (a) velocity hold switching means for communicating with said computer to maintain the aircraft velocity at a substantially constant speed and for activating said vernier control switch; and
   (b) detent switching means for communicating with said computer to disengage velocity hold and to disengage the vernier control switch, thereby permitting power command functions.

9. The digital power controller of claim 6 further including linear handle guide means for providing movement of said handle in a substantially linear direction.

10. The digital power controller of claim 6 further including means for providing radial movement of said handle.

* * * * *